(12) United States Patent
Hartley (10) Patent No.: US 11,488,584 B2
(45) Date of Patent: Nov. 1, 2022

(54) VOICE RECOGNITION-BASED TASK ALLOCATION AND SELECTIVE CONTROL OF HOTWORD DETECTION FUNCTION IN A VEHICLE NETWORK

(71) Applicant: GM GLOBAL TECHNOLOGY OPERATIONS LLC, Detroit, MI (US)

(72) Inventor: Steven Hartley, Pointe-Claire (CA)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 17/007,808

(22) Filed: Aug. 31, 2020

(65) Prior Publication Data
US 2022/0068262 A1  Mar. 3, 2022

(51) Int. Cl.
*G10L 15/08* (2006.01)
*H04W 4/80* (2018.01)
*G10L 15/22* (2006.01)

(52) U.S. Cl.
CPC ............ *G10L 15/083* (2013.01); *G10L 15/22* (2013.01); *H04W 4/80* (2018.02); *G10L 2015/088* (2013.01); *G10L 2015/223* (2013.01)

(58) Field of Classification Search
CPC ..... G10L 15/08; G10L 15/083; G10L 15/183; G10L 15/22; G10L 15/26; G10L 15/28; G10L 2015/0631–0638; G10L 2015/221–228
USPC .... 704/270.1, 275, 270, 276, 231, 245, 250, 704/255
See application file for complete search history.

(56) References Cited

U.S. PATENT DOCUMENTS

| 2010/0279612 | A1 | 11/2010 | Harwood et al. |
| 2014/0195252 | A1* | 7/2014 | Gruber .................... G10L 15/22 704/275 |
| 2014/0270197 | A1* | 9/2014 | Krishnamurthy ... H04M 1/6008 381/56 |
| 2020/0258502 | A1* | 8/2020 | Mitchell ................. G10L 15/22 |

FOREIGN PATENT DOCUMENTS

| CN | 110381216 A | 10/2019 |
| KR | 101646379 B1 | 8/2016 |

* cited by examiner

*Primary Examiner* — Qi Han
(74) *Attorney, Agent, or Firm* — Quinn IP Law (57) ABSTRACT

A method for voice recognition (VR)-based task allocation and hotword detection function control for within a wireless network having a hands-free (HF) node, e.g., a motor vehicle or telematics unit thereof, and an audio gateway (AG) node such as a wireless device, includes detecting, via a first wireless chipset of the HF node, a second wireless chipset of the AG node. The wireless chipsets include respective VR engines responsive to a corresponding hotword. The method includes establishing a Bluetooth or other wireless connection between the wireless chipsets in response to detecting the second wireless chipset. The method may include automatically transmitting a disable command signal to the second wireless chipset, via the first wireless chipset, to thereby disable a hotword detection function of the second wireless chipset. The method may be recorded on a computer readable medium as instructions executable by a processor.

20 Claims, 4 Drawing Sheets

000000000000000# VOICE RECOGNITION-BASED TASK ALLOCATION AND SELECTIVE CONTROL OF HOTWORD DETECTION FUNCTION IN A VEHICLE NETWORK

INTRODUCTION

In a wireless communication network, a wireless communication chipset-equipped device ("wireless device") such as a mobile/cellular phone, laptop or tablet computer, or a wearable device such as a wireless headset/earpiece is able to pair with and connect to router and other wireless chipset-equipped devices on the wireless communication network. The wireless chipsets may each be embodied as a respective System-on-a-Chip (SoC) inclusive of one or more processing cores, memory devices, modems, antennas, transceivers, input/output circuitry, and other hardware components.

Aboard a modern motor vehicle, a vehicle telematics unit (VTU) having a resident wireless communication chipset interfaces with an in-vehicle controller area network (CAN) bus and back-end cloud servers to provide internet access, as well as in-vehicle access to a host of information and system control functions. When a compatible wireless device is discoverable, e.g., using Bluetooth, WiFi, or another suitable wireless communications protocol, the VTU automatically pairs with and connects to the detected wireless device. The VTU is thereafter able to control operation of the paired wireless device, such as by transmitting or receiving incoming phone calls or text messages, accessing applications ("apps") residing on the paired device, or projecting/displaying content from the paired wireless device via a display screen of an infotainment system, etc. Such "hands-free" functionality allows occupants of the vehicle to focus more closely on the driving task while still enabling limited use of the paired device within the vehicle.

VR detection functions are prevalent in modern smartphones, other types of mobile/cell phones, and other wireless devices, VTUs, and VR-enabled devices such as streaming media players and televisions. In a typical exchange, a user utters a platform-specific phrase or "hotword". In response, the VR-enabled device wakes up a resident VR engine and thereafter readies itself to receive a spoken command ("utterance"), with the intent of the utterance derived by translation and/or direct speech recognition. As wireless chipset-equipped devices utilize operating systems and VR assistants that are programmed to respond to a particular hotword, it is possible for processing and priority conflicts to result in operating environments in which multiple wireless devices share the same hotword and/or are, to at least some extent, capable of performing the same requested functions.

SUMMARY

Disclosed herein are methods and systems for selectively disabling/enabling a local hotword detection function of a wireless communication chipset-equipped device ("wireless device") within a wireless network, and for automated inter-network allocation of voice recognition (VR)-based tasks. Within the wireless network, the wireless device is referred to herein in some embodiments as an Audio Gateway (AG) node. In an exemplary motor vehicle embodiment, a vehicle telematics unit (VTU) of the motor vehicle may function as a Hands-Free (HF) node, with the abbreviations AG and HF having well established meanings in the art. In some cases, the respective AG and HF nodes may respond to the same hotword when waking up their respective VR engines. As a result, it may at times be unclear as to whether the wireless device/AG node or the VTU/HF node should process and act on the intent of a user's subsequent to detection of the hotword.

While various illustrative examples are provided herein in which the HF node is embodied as the VTU, those of ordinary skill in the art will appreciate that other systems using a wireless network may benefit from the present teachings. The present disclosure is therefore not limited to vehicular applications in general or motor vehicle applications in particular. Likewise, the present teachings may be extended to forward-looking chipset architectures and wireless communications standards, and therefore references made here to Bluetooth, Near-Field Communication (NFC), etc., is non-limiting and exemplary unless otherwise stated.

An exemplary embodiment is disclosed herein for a method of VR-based task allocation and hotword detection function control for within a wireless network having separate HF and AG nodes as noted above. The method may include detecting a second wireless chipset of the AG node. The first wireless chipset and the second wireless chipset include a respective VR engine responsive to a corresponding hotword. The method in this embodiment also includes establishing a wireless connection between the first wireless chipset and the second wireless chipset in response to detecting the second wireless chipset. In response to a predetermined condition, the method includes automatically transmitting a disable command signal from the first wireless chipset of the HF node to the second wireless chipset of the AG node to temporarily disable a hotword detection function of the second wireless chipset.

The method in some implementations includes receiving, via the first wireless chipset of the HF node in response to the disable command signal, a confirmation signal indicative of a successful disabling of the hotword detection function of the second wireless chipset, and then processing a VR request of a user of the wireless network using the first wireless chipset of the HF node in response to the confirmation signal. Processing the VR request may optionally include selectively routing the VR request to the second wireless chipset for processing by the second wireless chipset.

An embodiment of the method may include receiving, via the first wireless chipset of the HF node, an error message signal indicative of an unsuccessful disabling of the hotword detection function of the second wireless chipset, and then executing a control action via the first wireless chipset in response to the error message signal.

When the connection is a Bluetooth connection, the method may include automatically transmitting the disable command signal to the second wireless chipset includes transmitting a modified Bluetooth VR activation/enhanced VR activation attention (AT+BVRA) command to the second wireless chipset.

The HF node may include a display screen, and wherein the predetermined condition is a requested projection of an application of the AG node onto the display screen of the HF node. In embodiments of the HF node that include a vehicle telematics unit (VTU) coupled to the display screen, the first wireless chipset of the HF node may be a hardware component of the VTU.

The method may also include receiving, via the first wireless chipset, a termination signal indicative of a predetermined termination event. In response to receiving the termination signal, the method may further include transmitting an enable command signal to the first wireless chipset of the AG node, via the second wireless chipset of the HF node, to thereby automatically re-enable the hotword detection function of the second wireless chipset.

A motor vehicle is also disclosed herein having road wheels connected to a vehicle body, and a VTU having a first wireless chipset. The VTU is configured to detect, via the first wireless chipset of the VTU, a second wireless chipset of a wireless device within the wireless network, the first wireless chipset and the second wireless chipset including a respective VR engine responsive to a corresponding hotword, and to establish a wireless connection between the first wireless chipset and the second wireless chipset in response to detecting the second wireless chipset. In response to a predetermined condition, the VTU is configured to automatically transmit a disable command signal to the second wireless chipset to thereby temporarily disable a hotword detection function of the wireless device.

Computer-readable medium embodiments are also disclosed herein, with instructions recorded thereon being executable by a processor of a VTU. The VTU may be a component of a motor vehicle. Execution of the instructions by a processor of the VTU causes the VTU to execute the above-described method.

The above-noted and other features and advantages of the present disclosure will be readily apparent from the following detailed description of the embodiments and best modes for carrying out the disclosure when taken in connection with the accompanying drawings and appended claims.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover modifications, equivalents, combinations, and alternatives falling within the scope and spirit of the disclosure as defined by the appended claims.

DETAILED DESCRIPTION

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
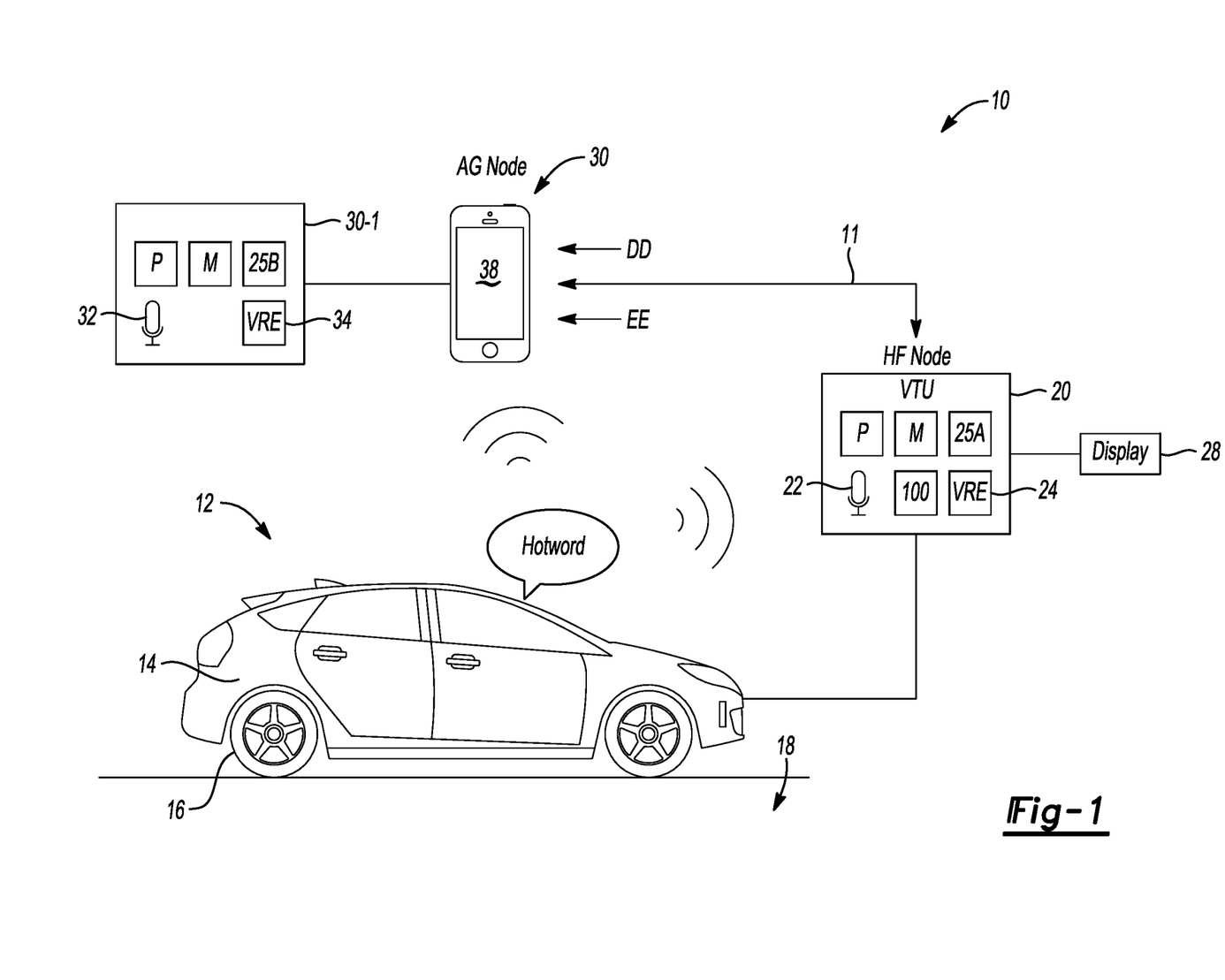
FIG. 1 is a schematic illustration of a representative wireless network configured to operate in accordance with the present method.

Referring to the drawings, wherein like reference numbers refer to like components, a wireless network 10 as depicted schematically in FIG. 1 includes an exemplary motor vehicle 12 having a vehicle body 14 coupled to a set of road wheels 16. The road wheels 16 are in rolling contact with a road surface 18, such that torque produced by a propulsion system (not shown) rotates the road wheels 16 when propelling the motor vehicle 12. The motor vehicle 12 also includes a resident vehicle telematics unit (VTU) 20 configured to execute instructions embodying a method 100, an exemplary embodiment of which is described below with reference to FIG. 4.

The VTU 20 includes a first wireless chipset 25A having or coupled to a first voice recognition engine (VRE) 24, with the first VRE 24 being responsive to a first predetermined hotword. As appreciated in the art, a hotword as used herein is a predetermined phrase or wakeword, the detection of which causes the VRE 24 to awaken and ready itself for a subsequent verbal command. Execution of the method 100 by one or more resident processors (P) of the VTU 20 allows the first wireless chipset 25A to selectively disable or enable hotword functionality of a VR-enabled wireless device 30 that is paired and connected to the VTU 20, with "connected to" being either via a wireless connection/pairing or a direct connection, e.g., using a USB cable. Thus, using established parlance, the VTU 20 and its resident first wireless chipset 25A act as a hands-free (HF) node within an embodiment of the wireless network 10, while the wireless device 30 and a resident second wireless chipset 25B act as an audio gateway (AG) node within such an embodiment.

In order to perform the assigned processes or functions in accordance with the method 100, the VTU 20 and the wireless device 30 may be equipped with a respective display screen 28 or 38, a respective microphone 22 or 32, one or more processors (P) and sufficient computer-readable media indicated as memory (M), e.g., volatile and non-volatile storage in read-only memory (ROM), random-access memory (RAM), keep-alive memory (KAM), flash memory, and/or other suitable electric, magnetic, or optical memory or combinations thereof. Other components not depicted but considered part of the VTU 20 or coupled thereto include a speaker, buttons and/or input controls, display screens, etc.

The first and second wireless chipsets 25A and 25B are abstracted in FIG. 1 for illustrative simplicity. However, those of ordinary skill in the art will appreciate that constituent hardware components of the first and second wireless chipsets 25A and 25B may also include radio frequency (RF) transceiver circuitry, a local oscillator, signal amplifiers, mixers, filters, digital-to-analog converters and/or analog-to-digital converters, etc. The hardware components of the wireless device 30 may be integrated into a System-on-a-Chip (SOC) 30-1 in some embodiments.

The wireless device 30 may also be configured with an application-suitable variety of wireless communications capabilities. For example, the wireless device 30 may be configured to establish a wireless connection with the VTU 20 via a suitable short-range communication protocol such as Bluetooth, Near-Field Communication (NFC), etc. Other embodiments may be conceived that use WiFi, etc. The wireless device 30 may utilize other types of wireless connections and operate on further channels such as those corresponding to a cellular connection, for instance LTE, 5G, 4G, etc., a WiFi connection, etc.

While shown as a wireless device in the form of a smartphone in FIG. 1, other embodiments of the wireless device 30 are possible within the scope of the disclosure, including but not limited to a tablet computer, a laptop, a wearable device such as a smartwatch, an Internet-of-Things (IoT) device, etc., or a stationary device such as a desktop terminal in other embodiments of the wireless network 10. Likewise, the first wireless chipset 25A may be alternatively configured as part of a smartphone, head set, earpiece, or another device capable of functioning as an HF node in an HF-AG nodal arrangement. For illustrative consistency, however, the HF node of the wireless network 10 will be described hereinafter in the context of the VTU 20 when hosted by the motor vehicle 12, and the AG node will be described in the context of the wireless device 30 in the form of a user's mobile phone or smartphone when wirelessly paired with the VTU 20 in a typical driving scenario.

Operation of the present method 100 is described below in FIGS. 2 and 3 with respect to an exemplary Bluetooth embodiment in which the first wireless chipset 25A of the VTU 20, i.e., the HF node within the wireless network 10, pairs with/connects to the second wireless chipset 25B of the wireless device 30 acting as the AG node over an established Bluetooth connection. In some cases, the HF node and the AG node may use the same hotword to wake up their respective VREs 24 and 34. This may occur when running the same VR assistant over the same operating system, e.g., when the VTU 20 runs the ANDROID® Automotive Operating System (AAOS) concurrently with an ANDROID-AUTO (AA) session running on the wireless device 30. The AA application running on the wireless device 30 may be projected/casted via the display screen 28 via an AA app running on the VTU 20. The wireless device 30 and/or the VTU 20 in this instance may run the GOOGLE® VR Assistant application. When this occurs, it may be unclear which of the respective first or second wireless chipsets 25A or 25B should process the user's intent as expressed by a spoken phrase or utterance. Outside of this exemplary conflict case, scenarios exist in which the first and second wireless chipsets 25A and 25B are triggered by different hotwords. In such a case, the method 100 may still be beneficial when managing the particular node that will be responsible for acting on a given utterance.

For example, the present approach enables the VTU 20 and its resident first wireless chipset 25A, in response to a predetermined condition, to automatically transmit a disable command signal (arrow DD of FIG. 1) to the second wireless chipset 25B of the wireless device 30, e.g., a part of the communications signals (double-headed arrow 11) likewise shown in FIG. 1. The disable command signal (arrow DD), when acted on by the second wireless chipset 25B of the wireless device 30, has the effect of temporarily disabling or preventing execution of a resident hotword detection function of the second wireless chipset 25B. This control action in turn may help avoid instances of duplicate hotword detection and subsequent VR activation in cases where the HF node and the AG node share the same hotword. Likewise, this control action may help avoid a conflict between assistants when assigning a given user utterance to the HF node or the AG node for processing, even when different hotwords are employed. An enable command signal (arrow EE) may be likewise transmitted to the wireless device 30 when re-enabling the hotword detection function in response to a predetermined enabling condition, such as when the user ends her projection session within the motor vehicle 12.

Figure 2:
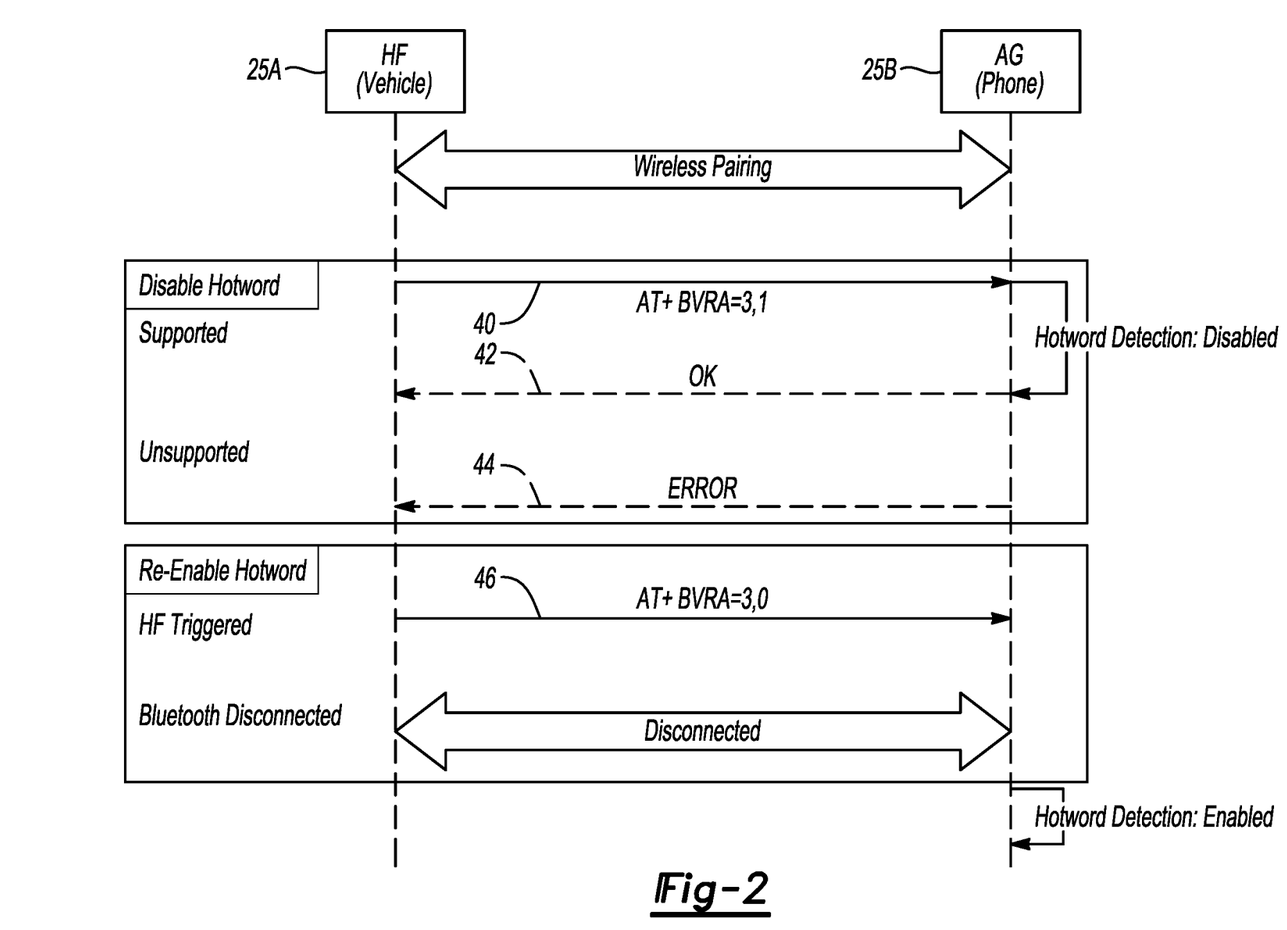
FIGS. 2 and 3 are schematic logic flow diagrams describing operation of the present method in an exemplary Bluetooth-enabled operating environment.
Figure 3:
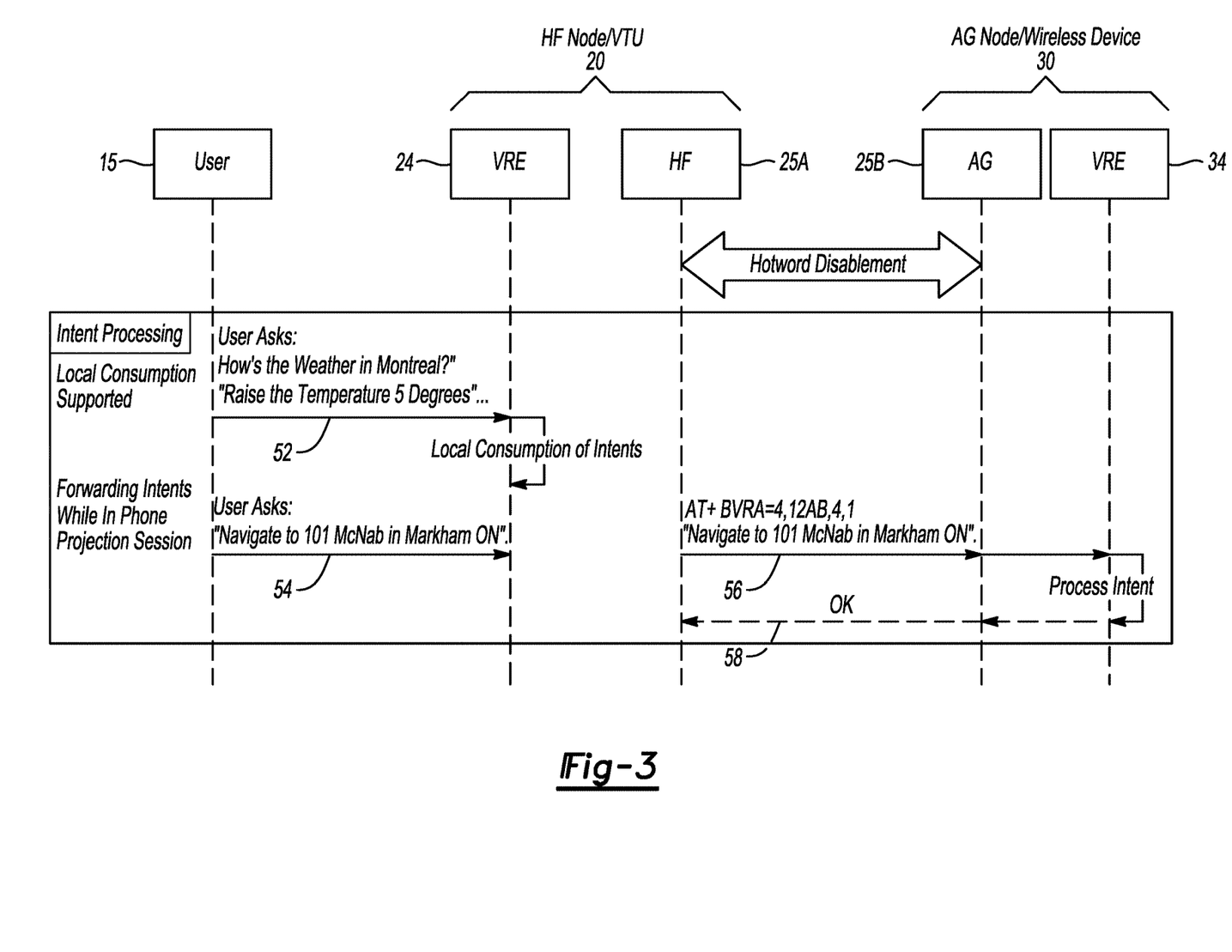

FIGS. 2 and 3 use a non-limiting embodiment in which the above-described disable command to the second wireless chipset is a modified Bluetooth VR activation/enhanced VR activation attention (AT+BVRA) command (arrow 40). As will be appreciated by those of ordinary skill in the art, AT+BRVA commands are defined in the Bluetooth Hands Free Protocol (HFP), Version 1.8, § 4.25 and § 4.35.1. Enhanced BRVA, which extends BRVA with additional fields, allows for more granularity into the VR communication flow between an AG node and an HF node, e.g., the wireless device 30 and the VTU 20 within the representative wireless network 10 of FIG. 1.

As will be appreciated by those of ordinary skill in the art, typical AG+BRVA syntax includes an integer value of 0, 1, or 2, with an integer value of 2 allowing for certain extended functions. An integer value of 1 serves to trigger the VRE 34 of the wireless device 30 to begin voice recognition using its own microphone 32, by bypassing the need for hotword detection by the wireless device 30. An integer value of 0 has the opposite effect of telling the wireless device 30, i.e., the AG node, to stop voice recognition processing. In a real-world example aboard a motor vehicle equipped with hands-free functionality, e.g., the motor vehicle 12 of FIG. 1. an extended depression of a button on a steering wheel would have the effect of AG+BRVA=1, thereby allowing the user to utter a command without first having to articulate the hotword, e.g., "Hey, ALEXA®!", "Hey, SIRI®!", or "Hey, GOOGLE®!". The present approach may use another integer value such as 3 to request disabling of the resident hotword function of the AG node, e.g., the wireless device 30 of FIG. 1, by action of the VTU 20 and the above-described disable command signal (arrow DD) of FIG. 1. If the AG node/wireless device 30 does not support the new AV+BVRA value, i.e., AT+BVRA=3, 1 (arrow 40), the AG node/wireless device 30 may respond with an error message signal (arrow 44) in lieu of sending an affirmative confirmation signal, e.g., OK (arrow 42), back to the first wireless chipset 25A.

In this illustrative example, modification may be made to the hands-free protocol to extend the AT+BRVA command in a manner that allows the HF node, e.g., the VTU 20 and resident first wireless chipset 25A shown in FIG. 1, to selectively disable or later re-enable the hotword detection function residing aboard the wireless device 30 by transmitting a command AT+BRVA=<3, 0> (arrow 46). In turn, this capability allows the first wireless chipset 25A to process VR requests, and to selectively forward the VR requests to the wireless device 30 for action as needed. In this manner, the VTU 20 is operable for arbitrating the VR request among multiple competing VR assistants within the wireless network 10, e.g., by selecting the first wireless chipset 25A of the HF node or the second wireless chipset 25B of the AG node for acting on the intent of the VR request.

FIG. 2 in particular schematically illustrates the present approach in which the HF node, e.g., the VTU 20 of FIG. 1, is wirelessly paired with and connected to the AG node, e.g., the wireless device 30. To selectively disable hotword detection function of the AG node/wireless device 30, the HF node/VTU 20 may transmit an AT+BRVA signal (arrow 40) of <3, 1>. The integer value of 1 has the effect of disabling the local hotword detection function of the AG node/wireless device 30, with the new integer value of 3 having the effects noted herein. Such effects include causing the AG node/wireless device 30 to respond with confirmation that hotword detection function has been successfully disabled ("OK", i.e., arrow 42) when the present functions are supported, or with an error message signal ("ERROR", i.e., arrow 44) in the alternative when such functions are not supported. To re-enable hotword detection function, the HF node/VTU 20 may respond to a termination signal by automatically re-enabling the hotword detection function of the AG node/wireless device 30, e.g., by transmitting the signal AT+BRVA=<3, 0> (arrow 46). Upon disconnection of the wireless link between the first and second wireless chipsets 25A and 25B, the hotword detection by VRE 34 of the wireless device 30 is automatically re-enabled, typically by the wireless device 30 itself without action of the VTU 20.

Referring to FIG. 3, intent processing operation of the method 100 may be understood with reference to a simplified example in which a user 15 of the AG node/wireless device 30 of FIG. 1 interacts with the HF node/VTU 20. For example, if after the local hotword function of the wireless device 30 is disabled in FIG. 2, the user 15 may utter the phrase, "how's the weather in Montreal?" or "raise the temperature 5 degrees", as represented by arrow 52, and in response, the VRE 24 of the HF node/VTU 20 may process the intent of the request locally ("local consumption of intents").

The HF node/VTU 20 may also selectively route a given VR request to the second wireless chipset 25B of the AG node/wireless device 30 for processing. Here, another AT+BRVA integer value, e.g., 4, may be used to facilitate sending of pre-processed text strings or "intents" to the AG node/wireless device 30 for text that is recognized by the VRE 24 of the HF node/motor vehicle 12, but that in the judgment of the HF node would be more appropriately handled by the AG node/wireless device 30.

Exemplary syntax may include AT+BVRA=<vrec>, [<textualRepresentation>], with <textual representation>: <textID>, <textType>, <textOperation>, <string>. Here, <textType> is a new text type having an integer value of 4, which is "text recognized by the HF Node". So, in an example embodiment in which the user 15 utters the phrase "Navigate to 1010 McNab in Markham, ON", i.e., arrow 54, the HF node 12 may automatically generate the exemplary AT+BRVA message "4, 12AB, 4, 1, "Navigate to 101 McNab Street in Markham, ON", arrow 56, wherein <vrec>=4 and <textual representation>=12AB, 4, 1, the utterance as a character string. The modified AT+BRVA message is then transmitted the AG node/wireless device 30 for processing of the intent by the AG node and its resident VRE 34 and second wireless chipset 25B. The AG node/wireless device 30 then confirms, e.g., via a message "OK" (arrow 58) back to the HF node/VTU 20.

Figure 4:
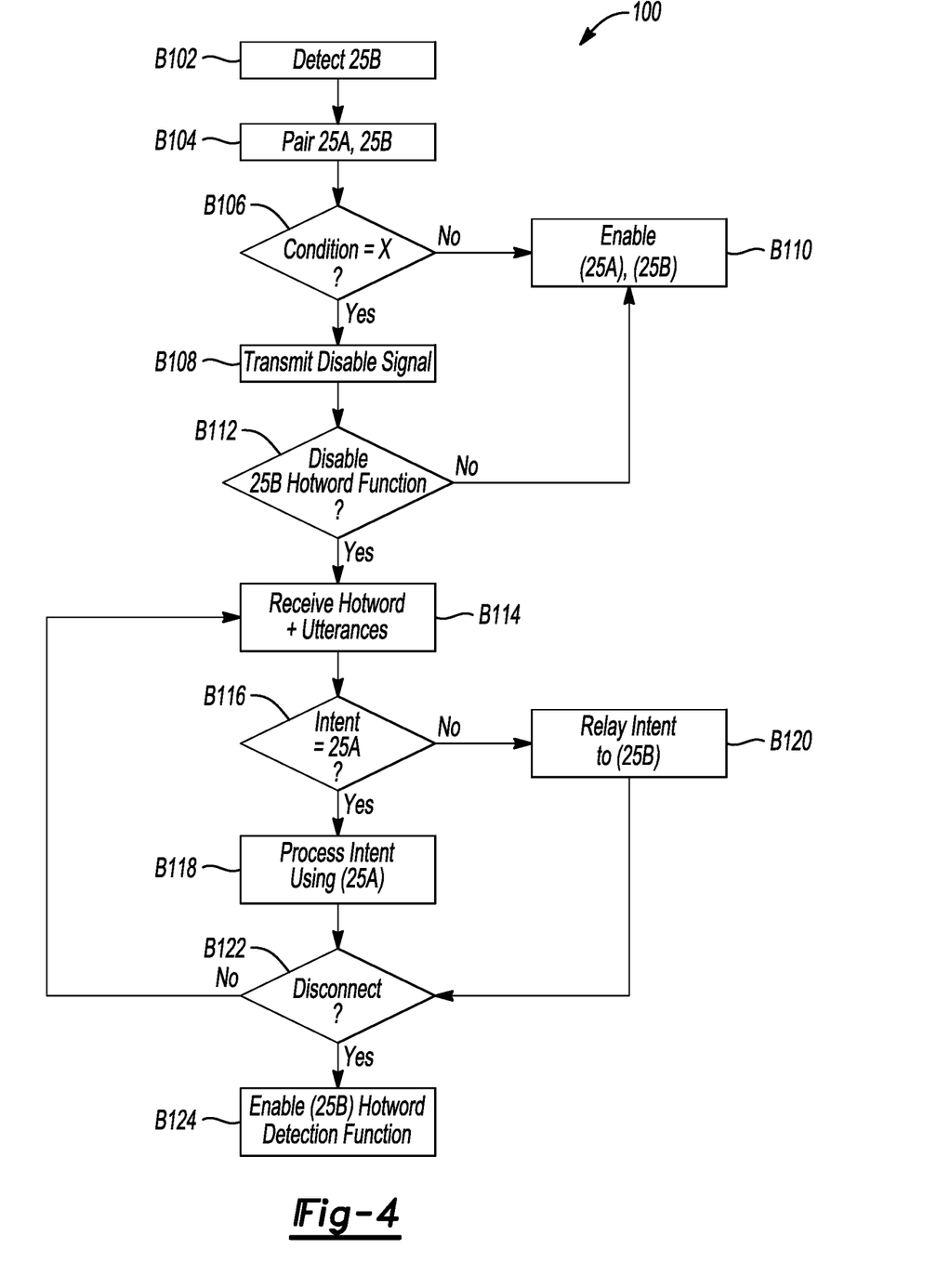
FIG. 4 is a flow chart describing an embodiment of a method for selectively disabling hotword detection function of a wireless device within a wireless network in accordance with the present disclosure.

Referring to FIG. 4, an exemplary embodiment of the method 100 is depicted for use aboard the motor vehicle 12, which itself is a non-limiting representation of a system equipped with the first wireless chipset 25A. The first wireless chipset 25A includes the first VRE 24 that is responsive to a first predetermined hotword, the identity of which depends on the particular operating system and particular VR assistant employed thereby.

Commencing with block B102, the method 100 includes detecting the second wireless chipset 25B via the first wireless chipset 25A of the HF node, with the wireless device 30 acting as the AG node in this embodiment. Bluetooth, NFC, or other suitable short-range RF detection processes and protocols may be used in implementing block B102. As detailed above, the second VRE 34 of the second wireless chipset 25B is responsive a hotword, which may be the first predetermined hotword when the same operating system and VR assistant is used by the HF node and the AG node, or a different second predetermined hotword in other embodiments. The method 100 proceeds to block B104 when the second wireless chipset 25B has been detected.

At block B104, the method 100 includes wireless pairing of the first wireless chipset 25A with the second wireless chipset 25B. As will be appreciated by those of ordinary skill in the art, successful point-to-point pairing of a discoverable device, e.g., the second wireless chipset 25B within the exemplary wireless device 30 of FIG. 1, is established using a shared pass-key over a frequency channel in the 2.4 GHz band for authentication. Other short-range pairings other than Bluetooth may be used in other embodiments. Block B104 is complete when the HF node and the AG node are successfully paired, at which point the method 100 proceeds to block B106.

Block B106 of FIG. 4 includes determining if a predetermined condition is satisfied or true. For example, the predetermined condition may be a requested projection of an application of the wireless device 30 onto the display screen, e.g., ANDROID AUTO®. Alternatively, the predetermined condition of block B106 may be the establishing of the wireless pairing in block B104, such that the method 100 occurs whenever a capable wireless device 30 is present and paired with the HF node. Other predetermined conditions may be envisioned within the scope of the disclosure, including but not limited to a user-enabled setting on the wireless device 30 and/or the HF node. The method 100 proceeds to block B108 when the predetermined condition is satisfied, and to block B110 in the alternative when the predetermined condition is not satisfied.

At block B108, the method 100 includes automatically transmitting the disable command (arrow DD of FIG. 1) to the second wireless chipset 25B via the first wireless chipset 25A of FIG. 1 to thereby request disabling of a hotword detection function of the second wireless chipset 25B. Some embodiments of the method 100 may, as a subset of block B108, differentiate the operating system and VR assistant running on the wireless device 30, with transmission of the disable command (arrow DD) being conditional on a match. Such an approach would help avoid duplicate hotword detection and VR activation within the motor vehicle 12 or other system. Other embodiments may proceed by disabling hotword detection function of the wireless device 30 regardless of whether the wireless device 30 is using the same hotword as the HF node, e.g., the VTU 20.

The disable command (arrow DD) transmitted to the second wireless chipset 25B may be the modified Bluetooth AT+BVRA command described above with reference to FIG. 2, e.g., an integer value of 3 in a scenario in which the underlying protocol has been revised to allow for such an exchange. In non-Bluetooth embodiments, a similar approach may be used in other protocols, possibly including a platform-specific protocol used within the confines of the motor vehicle 12. The method 100 then proceeds to block B112.

At block B110, with the predetermined condition not satisfied at preceding block B106, both wireless chipsets 25A and 25B remain enabled and thus ready to receive VR commands within the motor vehicle 12. Blocks B106 and B110 may execute in a loop until the predetermined condition is detected. Timeouts or other event-driven criteria such as key-off events in a vehicular embodiment of the motor vehicle 12 may be used to end method 100, with the method 100 starting anew with block B102 in such an implementation.

Block B110 may also include executing a control action via the first wireless chipset 25A of the HF node/VTU 20 when block B112 (described below) returns an error message signal. For instance, when the wireless device 30 is not responsive to the disable command signal (arrow DD of FIG. 1) transmitted in block B108, the HF node/VTU 20 may continue to allow the AG node/wireless device 30 to function per its local hotword detection function, and may even route appropriate VR commands or utterances to the wireless device 30 for action by the second wireless chipset 25B, analogously to block B120 as set forth below.

Block B112 includes detecting a result of the command (arrow DD) to determine if the disable command signal (arrow DD) from the VTU 20 has succeeded in disabling the local hotword function of the wireless device 30. For instance, and as shown in FIG. 2, the wireless device 30 when configured to work in the context of method 100 will respond in one of two manners: (a) with a confirmation signal, e.g., a predetermined bit or bitstring value indicative of a disabled hotword function, or (b) with an error message signal indicative of a failed attempt to disable, or of incompatibility of the wireless device 30 with the disable command (arrow DD).

The lack of a return signal from the wireless device 30 to the HF node after a predetermined duration may result in auto-generation of such an error message signal by the HF node/VTU 20. Thus, block B112 may include receiving, via the first wireless chipset 25A, an error message signal indicative of the second wireless chipset 25B being nonresponsive to the disable command in some manner. The method 100 proceeds to block B110 when disablement of the hotword detection function of the wireless device 30 was unsuccessful, and to block B114 when the hotword detection function was disabled Block B114 entails receiving a hotword and utterance or spoken phrase by the user 15 of FIG. 3, via the microphone 22 depicted in FIG. 1. Block B114 includes translating the speech to text using a suitable speech-to-text translator, e.g., programmed into memory (M) of the VTU 20 in the vehicular embodiment of the HF node or via communication with a separate speech-to-text translator application. The method 100 then proceeds to block B116.

At block B116, the HF node determines intent of the utterance collected at block B114. As used herein, "intent" means the particular function the user 15 seeks to control or the particular result the user 15 means to affect. Various functions or results could be desired for a given utterance. Non-limiting examples include requests for weather or traffic updates, requests to adjust a temperature, fan setting, playlist, radio station/other infotainment setting, or a navigation request, e.g., for turn-by-turn driving directions in a vehicular embodiment of the motor vehicle 12 of FIG. 1.

Each utterance may correspond to either the AG node or the HF node in terms of a resident capability to act on the request, or both the AG node and the HF node may be capable of satisfying the request. Block B116 may therefore include discerning the intent of the utterance, via the first wireless chipset 25A of the HF node, to determine whether the utterance would be best executed by the first wireless chipset 25A. If so, the method 100 proceeds to block B118. The method 100 otherwise proceeds to block B120 when the intent is more suitable for execution by the second wireless chipset 25B.

At block B118, the method 100 includes processing the intent via the first wireless chipset 25A. Thus, when the second wireless chipset 25B responds to the disable command (arrow DD of FIG. 1) by disabling its hotword detection function at block B112, an end result could be the processing of the VR request/utterance of the user 15 via the first wireless chipset 25A at block B118, provided the intent matches the capabilities of the first wireless chipset 25A as determined at block B116. The method 100 proceeds to block B122 after processing the intent.

At block B120, the method 100 includes relaying the intent to the second wireless chipset 25B. In this manner, the first wireless chipset 25A may arbitrate the VR request of the user 15 by selecting the second wireless chipset 25B for processing of the VR request or utterance detected at block B114. In other embodiments, the first wireless chipset 25A may not send the pre-processed intents to the second wireless chipset 25B, but instead may forward the audio itself to the microphone 32 of the wireless device 30. Such an option may be enabled through existing extended Bluetooth VR command AT+BVRA=2. The second wireless chipset 25B then executes the intent, e.g., by displaying a playlist or other using another app residing on the wireless device 30 or other AG node. Thus, processing the VR request or utterance from block B114 after disabling the hotword detection function of the VG node may include selectively routing the VR request to the second wireless chipset 25B for processing aboard the wireless device 30/AG node. The method 100 then proceeds to block B122.

Block B122 entails determining the paired devices from block B104 has ended, i.e., if the AG node/wireless device 30 has disconnected from the HF node/VTU 20 in the illustrated vehicular embodiment of FIG. 1. Block B122 may include receiving a termination signal via the first wireless chipset 25A that is indicative of the broken connection/terminated pairing, with the termination signal possibly embodied in various ways, e.g., as a bit/bitstream or lack thereof when the wireless device 30 is no longer detected. For example, the user 15 of FIG. 3 may turn off the motor vehicle 12 off and walk away, e.g., after parking. The method 100 proceeds to block B124 when the devices are no longer paired, or repeats block B114 in the alternative when the AG node and HF node remain paired.

At block B124, the method 100 includes, in response to the above-noted termination signal, automatically re-enabling the hotword detection function of the second wireless chipset 25B via the first wireless chipset 25A. In this instance, the first wireless chipset 25A may transmit the hotword detection enabling command (arrow EE) to the second wireless chipset 25B as shown in FIG. 2 using the Bluetooth pairing example, i.e., AT+BVRA=3, 0. Other approaches may be used within the scope of the disclosure to the same or similar effect. In a possible approach the AG node, absent receipt of the enabling command (arrow EE) from the HF node, may wait a predetermined duration after the pairing has ended before automatically restoring its resident hotword detection function, or the user 15 may do so via a corresponding setting on the wireless device 30. The method 100 is complete after block B124, resuming anew with block B102.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for voice recognition (VR)-based task allocation and hotword detection function control for use within a wireless network having a hands-free (HF) node and an audio gateway (AG) node, the method comprising:

detecting, via a first wireless chipset of the HF node, a second wireless chipset of the AG node, the first wireless chipset and the second wireless chipset including a respective VR engine responsive to a corresponding hotword;

establishing a wireless connection between the first wireless chipset and the second wireless chipset in response to detecting the second wireless chipset; and in response to a predetermined condition, automatically transmitting a disable command signal from the first wireless chipset of the HF node to the second wireless chipset of the AG node to thereby temporarily disable a hotword detection function of the second wireless chipset.

2. The method of claim 1, further comprising:

receiving, via the first wireless chipset of the HF node in response to the disable command signal, a confirmation signal indicative of a successful disabling of the hotword detection function of the second wireless chipset; and processing a VR request of a user of the wireless network using the first wireless chipset of the HF node in response to the confirmation signal.

3. The method of claim 2, wherein processing the VR request includes selectively routing the VR request to the second wireless chipset for processing by the second wireless chipset.

4. The method of claim 1, further comprising:

receiving, via the first wireless chipset of the HF node, an error message signal indicative of an unsuccessful disabling of the hotword detection function of the second wireless chipset; and executing a control action via the first wireless chipset in response to the error message signal.

5. The method of claim 1, wherein the wireless connection is a Bluetooth connection.

6. The method of claim 5, wherein automatically transmitting the disable command signal to the second wireless chipset includes transmitting a modified Bluetooth VR activation/enhanced VR activation attention (AT+BVRA) command to the second wireless chipset.

7. The method of claim 1, wherein the HF node includes a display screen, and wherein the predetermined condition is a requested projection of an application of the AG node onto the display screen of the HF node.

8. The method of claim 7, wherein the HF node includes a vehicle telematics unit (VTU) coupled to the display screen, and wherein the first wireless chipset of the HF node is a hardware component of the VTU.

9. The method of claim 1, wherein the predetermined condition is the establishing of the wireless connection.

10. The method of claim 1, further comprising:

receiving, via the first wireless chipset, a termination signal indicative of a predetermined termination event; and in response to receiving the termination signal, transmitting an enable command signal to the first wireless chipset of the AG node, via the second wireless chipset of the HF node, to thereby automatically re-enable the hotword detection function of the second wireless chipset.

11. A motor vehicle comprising:
a vehicle body;
road wheels connected to the vehicle body; and
a vehicle telematics unit (VTU) having a first wireless chipset, wherein the VTU is configured to:
detect, via the first wireless chipset of the VTU, a second wireless chipset of a wireless device within the wireless network, the first wireless chipset and the second wireless chipset including a respective voice recognition (VR) engine responsive to a corresponding hotword;

establish a wireless connection between the first wireless chipset and the second wireless chipset in response to detecting the second wireless chipset; and in response to a predetermined condition, automatically transmit a disable command signal to the second wireless chipset to thereby temporarily disable a hotword detection function of the wireless device.

12. The motor vehicle of claim 11, wherein the VTU is further configured to:

receive, via the first wireless chipset in response to the disable command signal, a confirmation signal indicative of successful disabling of the hotword detection function of the wireless device; and process a VR request of a user of the wireless network using the first wireless chipset in response to the confirmation signal.

13. The motor vehicle of claim 12, wherein the VTU is configured to process the VR request by selectively routing the VR request to the second wireless chipset for processing by the second wireless chipset.

14. The motor vehicle of claim 11, wherein the VTU is configured to receive, via the first wireless chipset, an error message signal from the wireless device that is indicative of an unsuccessful disabling of the hotword detection function of the second wireless chipset; and execute a control action in response to the error message signal.

15. The motor vehicle of claim 11, wherein the wireless connection is a Bluetooth connection, and the VTU is configured to automatically transmit the disable command signal to the second wireless chipset as a modified Bluetooth VR activation/enhanced VR activation attention (AT+BVRA) command.

16. The motor vehicle of claim 11, wherein the VTU is coupled to or includes a display screen, and wherein the predetermined condition is a requested projection of an application of the wireless device onto the display screen.

17. The motor vehicle of claim 11, wherein the predetermined condition is the establishing of the wireless connection.

18. The motor vehicle of claim 11, wherein the VTU is further configured to:

transmit an enable command signal to the second wireless chipset in response to a predetermined termination event to thereby re-enable the hotword detection function of the wireless device.

19. A non-transitory computer-readable medium on which is recorded instructions that are executable by a processor of a vehicle telematics unit (VTU) of a motor vehicle, the VTU having a first wireless chipset, wherein execution of the instructions by the processor causes the VTU to:

detect, via the first wireless chipset, a second wireless chipset of a wireless device within the motor vehicle, the first wireless chipset and the second wireless chipset including a respective voice recognition (VR) engine responsive to a corresponding hotword;

establish a Bluetooth connection between the first wireless chipset of the VTU and the second wireless chipset of the wireless device in response to detecting the second wireless chipset;

in response to a predetermined condition, automatically transmit a disable command signal to the second wireless chipset of the wireless device, via the first wireless chipset of the VTU, to thereby disable a hotword detection function of the wireless device, wherein the predetermined condition is the Bluetooth connection or a requested projection of an application of the wireless device onto a display screen of the VTU, and wherein the disable command signal is a modified Bluetooth VR activation/enhanced VR activation attention (AT+BVRA) signal;

receive a confirmation signal from the wireless device indicative of successful disabling of the hotword detection function; and in response to the confirmation signal, process a VR request of a user of the VTU and the wireless device using the first wireless chipset of the VTU and not the second wireless chipset of the wireless device.

20. The non-transitory computer readable medium of claim 19, wherein execution of the instructions by the processor causes the VTU to process the VR request via the first wireless chipset by selectively routing the VR request to the second wireless chipset of the wireless device.

* * * * *